W. E. SHOALES.
Harvester-Cutters.
No. 142,417. Patented September 2, 1873.
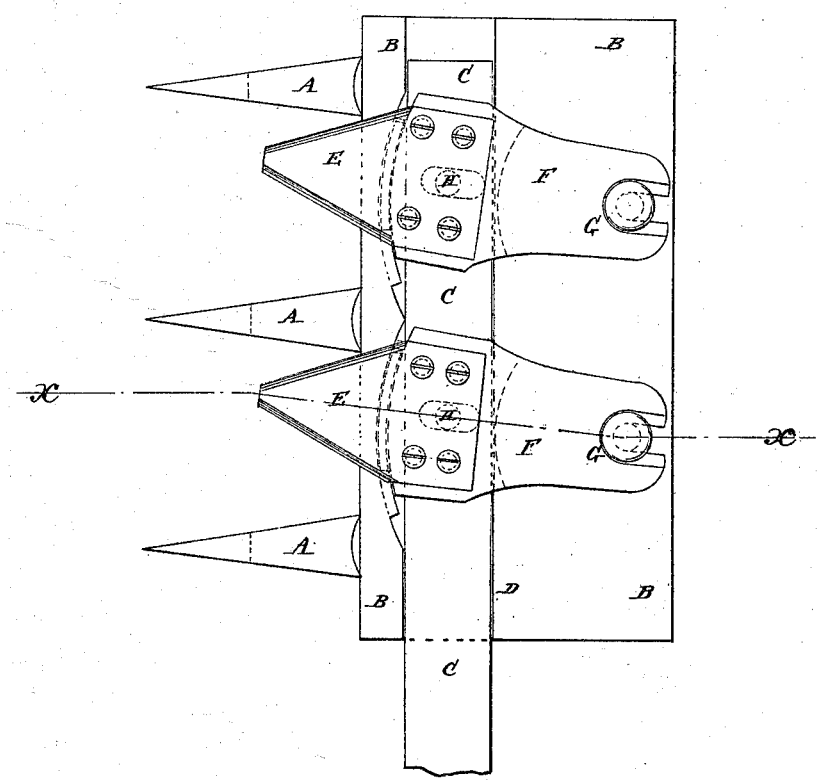
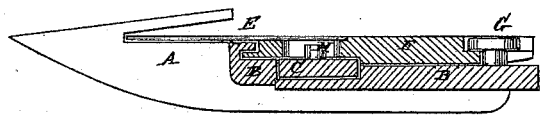
Witnesses:
A. W. Almqvist
O. Sedgwick
Inventor:
W. E. Shoales
Per Munn & Co.
Attorneys.
AM. PHOTO-LITHOGRAPHIC Co. N.Y. (OSBORNE'S PROCESS)

UNITED STATES PATENT OFFICE.

WILLIAM E. SHOALES, OF SHERBURNE FOUR CORNERS, NEW YORK.

IMPROVEMENT IN HARVESTER-CUTTERS.

Specification forming part of Letters Patent No. 142,417, dated September 2, 1873; application filed July 19, 1873.

*To all whom it may concern:*

Be it known that I, WILLIAM E. SHOALES, of Sherburne Four Corners, in the county of Chenango and State of New York, have invented a new and useful Improvement in Harvester-Cutters, of which the following is a specification:

Figure 1 is a top view of a portion of a harvester finger-bar, illustrating my invention. Fig. 2 is a cross-section of the same taken through the line $x$ $x$, Fig. 1.

Similar letters of reference indicate corresponding parts.

My invention pertains to the construction of the shanks of harvester-cutters and their mode of attachment to the finger-bar, as hereinafter described.

A are the fingers. B is the finger-bar, in the upper side of which, at its forward edge, is formed a groove, in which slides a bar, C, with which the pitman is connected, and the movement of which is limited by the length of the crank. E are the cutters, which are bolted to the shanks F. The rear ends of the shanks F are notched, and the said notches are rabbeted to receive a headed pin or bolt, G, attached to the upper side of the finger-bar B in such positions as to be directly opposite the center of the space between the fingers A. The pin G thus pivots the rear ends of the cutter-shanks, and holds them down upon the finger-bar B. In the central part of the forward end of the shanks F is formed a short slot to receive a pin, H, attached to the bar C, so that the cutters may be vibrated by the movement of the said bar C. The forward ends of the shanks F are rounded off upon the arc of a circle, having its center in the axis of a pin, G, and each shank has a flange formed upon the lower part of said end or edge, which flange fits into a groove formed in the forward edge of the curved recesses formed in the base of the fingers or guards A, at the forward edge of the groove in which the bar C works. At the ends of the curved recesses in the bases of the fingers B are formed notches, as shown in Fig. 1.

By this construction, by moving the bar C until the end of the forward edge of the shanks F comes opposite the said notch, the shanks F may be raised from the pin H, and withdrawn from the pins G. In this way any desired section may be detached and replaced without disturbing the others. By this construction, also, the cutters will operate with a shear-cut, and, the rear ends of the shanks F being pivoted, the cutters E will have a greater movement than the bar C, so that the pitman-crank may be made shorter than is necessary when the cutters are rigidly connected with the cutter-bar.

Having thus described my invention, I claim as new and desire to secure by Letters Patent—

1. The combination, with the recesses in base of fingers A and the headed pins G set in the finger-bar B, of the shanks F of the cutters, provided with a curved flange at their forward ends and a rabbeted notch at their rear ends, as shown and described.

2. The curved flange formed upon the forward end of the shanks F, in combination with the curved, grooved, and notched recess formed in the base of the fingers A at the forward side of the groove in the finger-bar B, substantially as herein shown and described.

WILLIAM E. SHOALES.

Witnesses:
S. A. BROWN,
P. M. FERRIS.